United States Patent
Castillo et al.

(10) Patent No.: US 12,385,444 B2
(45) Date of Patent: Aug. 12, 2025

(54) SYSTEM AND METHOD FOR OPERATING A COMBUSTOR WITH MULTIPLE LIQUID FUELS

(71) Applicant: General Electric Company, Schenectady, NY (US)

(72) Inventors: Jesus Daniel Castillo, Queretaro (MX); Ely Edgardo Tejeda, Queretaro (MX); Rene Graziano Torres, Queretaro (MX); Joe Floyd Schornick, Houston, TX (US); Tuy Cam Huynh, Houston, TX (US); Miroslaw Pawel Babiuch, Julianow (PL)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/755,306

(22) PCT Filed: Oct. 22, 2020

(86) PCT No.: PCT/US2020/056870
§ 371 (c)(1),
(2) Date: Apr. 26, 2022

(87) PCT Pub. No.: WO2021/086715
PCT Pub. Date: May 6, 2021

(65) Prior Publication Data
US 2022/0389876 A1   Dec. 8, 2022

(30) Foreign Application Priority Data
Oct. 30, 2019   (PL) .......................................... 431661

(51) Int. Cl.
*F02C 9/00* (2006.01)
*F02C 7/236* (2006.01)
*F02C 9/40* (2006.01)

(52) U.S. Cl.
CPC ................ *F02C 9/40* (2013.01); *F02C 7/236* (2013.01); *F05D 2220/32* (2013.01); *F05D 2240/35* (2013.01); *F05D 2260/60* (2013.01)

(58) Field of Classification Search
None
See application file for complete search history.

(56) References Cited

U.S. PATENT DOCUMENTS 2,720,750 A * 10/1955 Schelp ...................... F23R 3/38
239/590.5
3,766,734 A    10/1973 Jones
(Continued)

FOREIGN PATENT DOCUMENTS

| EP | 2497924 A2 | 9/2012 |
|----|------------|--------|
| EP | 2565427 A1 | 3/2013 |

(Continued)

OTHER PUBLICATIONS

Vdf.com, Variable Frequency Drive, 2016 (Year: 2016).*
(Continued)

*Primary Examiner* — Edwin Kang
(74) *Attorney, Agent, or Firm* — Fletcher Yoder, P.C.

(57) ABSTRACT

Method and system for transitioning from a first liquid fuel supplied to a combustor of a gas turbine system to a second liquid fuel supplied to the combustor utilizing a fuel pump configured to supply both fuels from the fuel pump during the transition without shutting down the gas turbine system. Through utilizing a fuel pump and adjusting the operation of the fuel pump during the transition, the additional costs, size, and operational complexity associated with multiple liquid fuel trains to facilitate operation of the gas turbine system with multiple liquid fuels may be avoided. The utilization of multiple liquid fuels during operation of a gas turbine system increase the operational flexibility of the gas turbine system by enabling the utilization of varied liquid fuel (Continued)

sources and/or local liquid fuel sources during a steady-state operation, yet utilizing standardized fuel sources for startup or shutdown procedures.

17 Claims, 4 Drawing Sheets

(56) References Cited

U.S. PATENT DOCUMENTS

| | | | | |
|---|---|---|---|---|
| 5,469,830 | A * | 11/1995 | Gonzalez | F02M 37/0064 |
| | | | | 123/515 |
| 5,490,387 | A * | 2/1996 | Bisson | F02C 7/236 |
| | | | | 60/734 |
| 6,079,198 | A | 6/2000 | Prowse et al. | |
| 2006/0053803 | A1* | 3/2006 | Parsons | F02C 9/30 |
| | | | | 60/734 |
| 2011/0100018 | A1 | 5/2011 | Nakamura | |
| 2011/0168137 | A1* | 7/2011 | Yagi | F02D 19/0652 |
| | | | | 123/510 |
| 2013/0074515 | A1* | 3/2013 | Widener | F02C 3/30 |
| | | | | 60/39.461 |
| 2013/0089437 | A1* | 4/2013 | Kennedy | F04C 14/24 |
| | | | | 418/209 |
| 2013/0186057 | A1* | 7/2013 | Shanmugam | F23R 3/36 |
| | | | | 60/776 |
| 2014/0096827 | A1 | 4/2014 | Scipio et al. | |
| 2015/0114477 | A1* | 4/2015 | Wood | B64D 37/22 |
| | | | | 137/12 |
| 2016/0146117 | A1* | 5/2016 | Swann | F02C 9/46 |
| | | | | 60/39.19 |
| 2016/0186670 | A1* | 6/2016 | Oba | F02C 9/263 |
| | | | | 417/15 |
| 2017/0167391 | A1* | 6/2017 | Demelas | F02C 9/30 |
| 2017/0184111 | A1 | 6/2017 | Brookes et al. | |
| 2017/0298850 | A1* | 10/2017 | Kurtz | F02D 19/081 |

FOREIGN PATENT DOCUMENTS

| | | |
|---|---|---|
| EP | 2716890 A2 | 4/2014 |
| JP | S55114848 A | 9/1980 |
| JP | H10169465 A | 6/1998 |
| JP | H11324719 A | 11/1999 |
| JP | 2001193488 A | 7/2001 |
| JP | 2010019195 A | 1/2010 |

OTHER PUBLICATIONS

PCT International Preliminary Report for Application No. PCT/US2020/056870 mailed May 12, 2022, 9 pgs.
Search Report and Preliminary Evaluation of Patentability for Polish Application No. P-431661, mailed May 21, 2020, 8 pgs.
Japanese Office Action for JP Application No. 2022-520081 mailed May 15, 2024, 5 pgs.
European extended search report for EP Application No. 24193929.7 mailed Oct. 16, 2024, 6 pgs.

* cited by examiner

SYSTEM AND METHOD FOR OPERATING A COMBUSTOR WITH MULTIPLE LIQUID FUELS

BACKGROUND

The subject matter disclosed herein relates to gas turbine systems, and more particularly, to gas turbine systems that combust multiple liquid fuels.

Gas turbine systems generally include a compressor, a combustor, and a turbine. The combustor combusts a mixture of compressed air and one or more fuels to produce hot combustion gases directed to the turbine to produce work, such as to drive an electrical generator or other load. The compressor compresses an oxidant flow (e.g., air), and subsequently directs the compressed oxidant to the combustor. Gas turbine systems may be configured to operate with various fuels. It may be desirable for efficiency, availability, and/or cost reasons to use some fuels during a first period of operation of the gas turbine system, and other fuels during a second period of operation of the gas turbine system. However, separate fuel supply systems for separate fuels may increase the cost and footprint of the gas turbine system. Moreover, it may be undesirable to shut down the gas turbine system to change the fuel source of the gas turbine system.

BRIEF DESCRIPTION

Certain embodiments commensurate in scope with the originally claimed subject matter are summarized below. These embodiments are not intended to limit the scope of the claims, but rather these embodiments are intended only to provide a brief summary of possible forms of the embodiments of the present disclosure. Indeed, the present disclosure may encompass a variety of forms that may be similar to or different from the embodiments set forth below.

In one embodiment, a system includes a fuel supply system. The fuel supply system includes a fuel pump having an inlet and an outlet. The fuel supply system also includes a first fuel feeding valve configured to control a first flow of a first liquid fuel to the inlet based at least in part on first feeding valve control signals. The fuel supply system further includes a second fuel feeding valve configured to control a second flow of a second liquid fuel to the inlet based at least in part on second feeding valve control signals. In addition, the fuel supply system includes
a motor coupled to the fuel pump. The motor includes a variable frequency drive device configured to drive the motor. The motor is configured to drive the fuel pump based at least in part on pump speed control signals. The fuel supply system also includes a main fuel control valve configured to regulate fuel flow to fuel manifolds/nozzles of a gas turbine system based at least in part on main fuel valve control signals. The main fuel valve control signals are based at least in part on load demands of the gas turbine system. The fuel supply system further includes a controller coupled to the motor, the first fuel feeding valve, the second fuel feeding valve and the main fuel control valve. The controller is configured to generate the first feeding valve control signals, the second feeding valve control signals, the pump speed control signals, and the main fuel control valve signals based at least in part on first fuel parameters of the first liquid fuel and second fuel parameters of the second liquid fuel. The controller is also configured to control a transition from the first flow to the inlet at a first time to a second flow at the inlet at a second time.

In one embodiment, a method for transitioning between liquid fuel flows supplied to a gas turbine system during operation of the gas turbine system includes supplying a first liquid fuel to an inlet of a fuel pump through a first fuel feeding valve opened to a first liquid fuel threshold. The first liquid fuel threshold is based at least in part on a first fuel parameter of the first liquid fuel. The method also includes directing the first liquid fuel from an outlet of the fuel pump to a combustor of the gas turbine system. The method further includes combusting the first liquid fuel with an oxidant in the combustor to generate exhaust gas. In addition, the method includes expanding the exhaust gas through a turbine of the gas turbine system to drive a shaft coupled to the turbine and to a load. The method also includes transitioning over a transition period from combustion of the first liquid fuel in the combustor to combustion of a second liquid fuel in the combustor. The transitioning includes opening a second fuel feeding valve to a second liquid fuel threshold to supply the second liquid fuel to the inlet of the fuel pump while supplying the first liquid fuel to the inlet. The second liquid fuel threshold is based at least in part on a second fuel parameter of the second liquid fuel. The transitioning also includes closing the first fuel feeding valve from the first liquid fuel threshold to stop supplying the first liquid fuel to the inlet in response to opening the second fuel feeding valve to the second liquid fuel threshold. The transitioning further includes controlling a speed of a motor configured to drive the fuel pump to maintain a discharge pressure of a liquid fuel flow at the outlet to be within a range of a transition pressure. The liquid fuel flow includes the first liquid fuel, the second liquid fuel, or any combination thereof.

In one embodiment, a fuel supply system includes a processor configured to control a first fuel feeding valve configured to direct a first liquid fuel to a fuel pump. The fuel pump is configured to supply the first liquid fuel, via a main fuel control valve, to a combustor during a startup period for a gas turbine system. The processor is also configured to determine a second liquid fuel threshold for a second fuel feeding valve based at least in part on first fuel parameters of the first liquid fuel and second fuel parameters of a second liquid fuel. The processor is further configured to control, during a transition period, the second fuel feeding valve to the second liquid fuel threshold to direct the second liquid fuel to the fuel pump while directing the first liquid fuel to the fuel pump. In addition, the processor is configured to control, during the transition period, the first fuel feeding valve to stop directing the first liquid fuel to the fuel pump in response to controlling the second fuel feeding valve to the second liquid fuel threshold. The processor is also configured to control, during the transition period, a speed of a motor configured to drive the fuel pump to maintain a discharge pressure of a fuel flow from the fuel pump at the main fuel control valve to be within a range of a transition pressure during the transition period. The fuel flow includes the first liquid fuel, the second liquid fuel, or any combination thereof. The processor is further configured to control the speed of the motor to drive the fuel pump to supply the second liquid fuel, via the main fuel control valve, to the combustor during a steady-state period for the gas turbine system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic block diagram of an embodiment of a gas turbine system with a fuel supply system having multiple fuels.

DETAILED DESCRIPTION

One or more specific embodiments of the present disclosure will be described below. To provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Gas turbine systems expand combustion gases through turbines to produce work that may drive one or more loads. Fuels provided to the gas turbine system may be provided to the combustor for generation of the combustion gases based on the chemical and physical parameters of the fuels, the cost of the fuels, and the availability of the fuels. Standardized fuels, such as diesel, natural gas, gasoline, jet fuel, may be available with consistent fuel parameters desirable for startup and shutdown operations. However, these standardized fuels may be more costly or less available than other fuel sources, such as those that may otherwise be flared near the site of the gas turbine system unless supplied to the gas turbine system to generate the combustion gases. Separate fuel pumps and/or compressors to deliver fuel from other fuel sources for steady-state operation of the gas turbine system may increase the footprint of the fuel supply system. However, analysis of the fuel parameters of the fuel sources as described herein enables the fuel supply system to provide different fuels to the combustor while avoiding a multi-phase fuel flow. For operation with multiple liquid fuels, through control of a variable speed motor to drive the fuel pump, and fuel control valves, the fuel supply system may maintain a discharge pressure of liquid fuel from the fuel pump while transitioning between liquid fuel sources of the fuel supply system. The systems and methods of controlling the liquid fuel supply system described herein maintain the stability of operation of the gas turbine system throughout the transition between liquid fuel sources.

Figure 1:
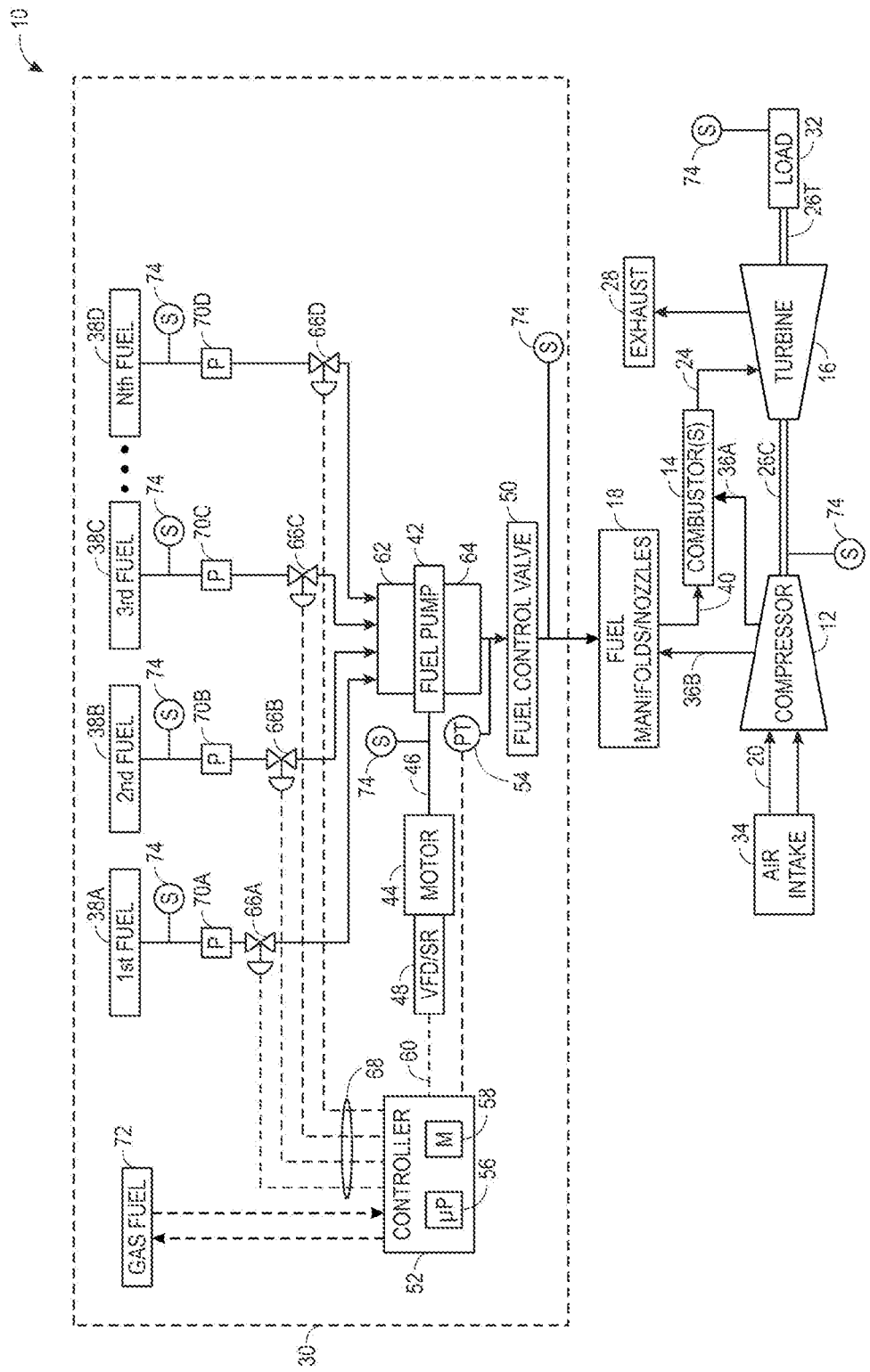

Turning now to the drawings, FIG. 1 illustrates a block diagram of an embodiment of a gas turbine system 10. The diagram includes a compressor 12, a turbine combustor 14, and a turbine 16. The turbine combustor 14 include one or more fuel manifolds/nozzles 18, which route a liquid fuel and/or gas fuel (e.g., natural gas, syngas, or any other gaseous fuel) from a fuel supply system 30 into the turbine combustor 14. The turbine combustor 14 ignites and combusts an air-fuel mixture to create hot, pressurized combustion gases 24, which are subsequently directed into the turbine 16. It may be appreciated that while FIG. 1 illustrates one turbine combustor 14, certain embodiments of the gas turbine system 10 may include multiple turbine combustors 14 that direct the combustion gases 24 to the turbine 16. Turbine blades of the turbine 16 are coupled to one or more shafts 26, which may also be coupled to several other components throughout the gas turbine system 10, such as the compressor 12 with a compressor shaft 26c. As the combustion gases 24 flow against the turbine blades in the turbine 16, the turbine 16 is driven into rotation, which causes a turbine shaft 26t to rotate. Eventually, the combustion gases 24 exit the gas turbine system 10 as an exhaust gas 28. The turbine shaft 26t may be coupled to a load 32, which is powered via rotation of the turbine shaft 26t. For example, the load 32 may be any suitable device that may generate power via the rotational output of the turbine system 10, such as a power generation plant or an external mechanical load. In certain embodiments, the load 32 may include an electrical generator, a propeller of a ship (e.g., in a marine application), and so forth.

In an embodiment of the gas turbine system 10, compressor blades are included as components of the compressor 12. The blades within the compressor 12 are coupled to the compressor shaft 26c and will rotate as the compressor shaft 26c is driven by the turbine 16, as described above. The rotation of the blades within the compressor 12 causes compression of a flow of air 20 received by the compressor 12 from an air intake 34, thereby forming pressurized airflow 36. For example, in certain embodiments, a first stream of pressurized airflow 36a may be fed into the one or more combustors 14, where it is used to oxidize the fuel from one or more sources 38 of the fuel supply system 30 inside the combustor 14. In certain embodiments, a second stream of pressurized airflow 36b may be fed into the fuel manifolds/nozzles 18 in which this pressurized airflow 36b is premixed with the fuel from one or more sources 38 of the fuel system 30 to produce a suitable air-fuel mixture 40 for combustion so as not to waste fuel or produce excess emissions.

The fuel supply system 30 of the present disclosure supplies fuel to the one or more fuel manifolds/nozzles 18 from the one or more fuel sources 38. The fuel supply system 30 may supply one or more liquid fuels to the fuel manifolds/nozzles 18 via a fuel pump 42. The fuel pump 42 may be a centrifugal or positive displacement pump coupled to a motor 44 via a pump shaft 46, controlling speed with a variable frequency control device 48, such as a variable frequency drive (VFD) motor, a switched reluctance (SR) motor, or a pump controlling the discharge pressure by adjusting the geometry on its discharge side. In certain embodiments, the fuel supply system 30 has only one fuel pump 42 configured to couple the one or more fuel sources 38 to a fuel control valve 50 directing the proper fuel flow to the one or more fuel manifolds/nozzles 18, thereby reducing a footprint of the fuel supply system 30 relative to a fuel supply system with multiple liquid fuel pumps in parallel.

In certain embodiments, the VFD/SR 48 of the motor 44, which is used to control the variable speed of the motor 44 and to control the discharge pressure to the fuel control valve 50, may be monitored and controlled by a gas turbine controller 52. In certain embodiments, the controller 52 may regulate the discharge pressure by controlling the output speed of the pump shaft 46 and the fuel pump 42 by continuously monitoring the discharge pressure by means of a pressure transmitter 54, located near a discharge of the fuel pump 42, which provides feedback to the controller 52 to close the control loop of pressure regulation. A processor 56 of the controller 52 may execute instructions stored in a memory 58 of the controller 52 to control the signals on the motor control line 60. In certain embodiments, the controller 52 may execute the control functions described herein automatically, without human intervention, based solely on feedback from the sensors and transmitters described herein.

The fuel pump 42 delivers fuel received at an inlet 62 of the fuel pump 42 to the one or more fuel manifolds/nozzles 18 via an outlet 64 of the fuel pump 42. The controller 52 may control which liquid fuels of the one or more liquid fuel sources 38 are directed to the inlet 62 via control of one or more respective fuel feeding valves 66 via signals (e.g., valve control signals) communicated on feeding valve control lines 68. For example, in certain embodiments, the supply of a first fuel source 38a (e.g., diesel) to the inlet 62 is controlled by a first fuel feeding valve 66a, the supply of a second fuel source 38b (e.g., liquid butane) to the inlet 62 is controlled by a second fuel feeding valve 66b, and the supply of a third fuel source 38c (e.g., naphtha) to the inlet 62 is controlled by a third fuel feeding valve 66c. As illustrated in FIG. 1, any number of fuel sources 38 (e.g., an $N^{th}$ fuel source 38d illustrated in FIG. 1) and corresponding fuel valves 66 may be used.

In certain embodiments, one or more forwarding pumps 70 may be arranged between the fuel sources 38 and the inlet 62 of the fuel pump 42. Each forwarding pump 70 may increase the pressure of the liquid fuel from the respective liquid fuel source 38 to reduce or eliminate two phase flows into the inlet 62 of the fuel pump 42. The controller 52 may control operation of the one or more forwarding pumps 70 in conjunction with control of the fuel feeding valves 66. For example, the controller 52 may stop a forwarding pump 70 when the respective fuel feeding valve 66 is closed, and may start a forwarding pump 70 when the respective fuel feeding valve 66 is opened.

In addition, in certain embodiments, the fuel supply system 30 of the present disclosure may supply gaseous fuel from one or multiple gas fuel sources 72. The controller 52 may command startup, shutdown, or steady-state operation with gaseous fuels, as well as command transfers from and to any of the multiple liquid fuels sources 38.

In certain embodiments, the liquid fuels may range by specific gravity: e.g., between 0.2 and 2.0; may range by vapor pressure at 20 deg C.: e.g., between 0.015 psi and 35 psi; may range by lubricity: e.g., between 350 μm and 1000 μm on high frequency reciprocating rig (HFRR) method; and may range by lower heating value: e.g., between 8,000 BTU/lbm and 20,000 BTU/lbm. This classification includes liquid hydrocarbons at ambient conditions, liquid alcohols at ambient conditions, liquid biofuels at ambient conditions, liquid fatty acids at ambient conditions, and so forth. Gas fuels may range by specific gravity: e.g., between 0.2 and 2.5; may range by hydrocarbon dew point at 14.696 psia (1 atm): e.g., between −100 and 100 F; may range by Modified Wobbe Index (MWI): e.g., between 10 and 80; may range by lower heating value by mass: e.g., between 5,000 and 22,000 BTU/lbm; and may range by lower heating value by volume: e.g., between 290 BTU/scf and 3700 BTU/scf.

As discussed in detail below, the processor 56 of the controller 52 may execute instructions from the memory 58 of the controller 52 to control quantities of the one or more fuel sources supplied to the liquid fuel pump 42 according to various control schemes. For example, the controller 52 may control the fuel feeding valves 66 to provide fuel to the inlet 62 from only one fuel source 38, to mix fuels in the liquid fuel pump 42 from two or more fuel sources 38, and to transition between fuels or fuel mixtures provided to the inlet 62. Although the embodiments discussed below discuss transitions between a first liquid fuel and a second liquid fuel, it is appreciated that the fuel supply system 30 may be controlled to control a transition from a first liquid fuel to a mixture of liquid fuels including the first liquid fuel, to control a transition from the first liquid fuel to a mixture of liquid fuels excluding the first liquid fuel, to control a transition from a mixture of liquid fuels to only the first liquid fuel of the mixture, or to control a transition from a mixture of liquid fuels to only a first liquid fuel that was not in the mixture. For such transitions, the controller may receive feedback from sensors, actuators, and/or input from an operator regarding the fuel parameters for each of the liquid fuels sources 38 of the fuel supply system 30. The fuel parameters for the liquid fuel sources 38 facilitate operation of the controller to determine the liquid fuel transition values that may affect the fuel feeding valve thresholds, the motor speed, the speed of the gas turbine system, the load on the gas turbine system, or any combination thereof.

The controller 52 of the fuel supply system 30 may receive feedback from one or more sensors 74 throughout the fuel supply system 30 and the gas turbine system 10. The sensors 74 may include, but are not limited to, pressure sensors, composition sensors, flow meters, temperature sensors, load sensors, rotation sensors, or any combination thereof. The sensors 74 may provide feedback to the controller 52 regarding the temperature of the liquid fuel sources 38, the pressure of the liquid fuel sources 38, the discharge pressure at the outlet 64 of the one or more fuels directed from the liquid fuel pump 42 indicated by pressure transmitter 54, the position of the fuel control valve 50, the speed of the pump shaft 46, the speed of the compressor shaft 26c of the gas turbine system 10, the speed of the turbine shaft 26t of the gas turbine system 10, the load 32 on the gas turbine system 10, or any combination thereof. The controller 52 may control the liquid fuel pump 42, the fuel feeding valves 66, and the fuel control valve 50 based at least in part on feedback from the one or more sensors 74.

Figure 2:
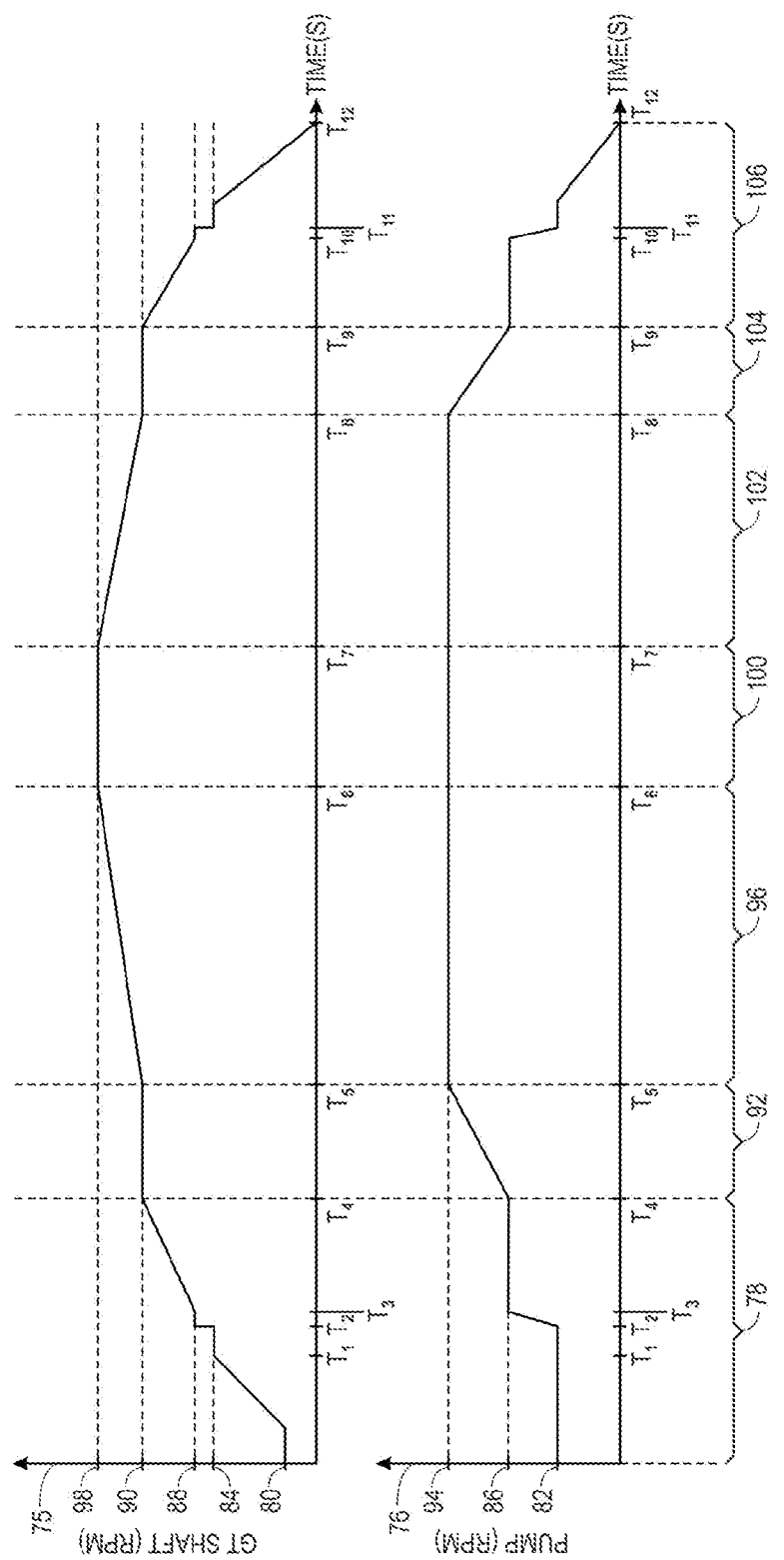
FIG. 2 illustrate charts of speeds of a compressor shaft of the gas turbine system and a pump shaft of the multiple fuels supply system during operation of the gas turbine system.

FIG. 2 depicts a chart 75 that illustrates the speed the compressor shaft 26c of an embodiment of the gas turbine system 10 of FIG. 1 during operation of the gas turbine system 10, and a chart 76 that illustrates the speed of the pump shaft 46 during operation of the gas turbine system 10 of FIG. 1. During a startup period 78, the gas turbine system 10 starts by combusting the first liquid fuel 38a (e.g., diesel) in the combustor 14 while the compressor shaft 26c is driven at a starter speed 80. During the startup period 78, components of the gas turbine system 10 are heated through operation. For example, combustion of the first fuel heats the combustor 14 and the turbine 16, the compression of the air 20 in the compressor 12 heats the compressor 12, and friction may warm lubricants in the compressor shaft 26c, the turbine shaft 26t, and the driven load 32. The load on the gas turbine system during the startup and shutdown operations may be less than approximately 50, 40, 30, 25, 20, or 10 percent of a rated load of the gas turbine system. The compressor shaft 26*c* may be initially driven at the starter speed by a starter until combustion of the fuel in the combustor 14 produces enough combustion gases to drive the turbine 16 and the compressor shaft 26*c* at speeds greater than the starter speed 80.

The controller 52 may control the VFD/SR 48 of the motor 44 to drive the fuel pump 42 at an initial pump speed 82. The starter speed 80 of the compressor shaft 26*c* may be approximately 2400 RPM. In certain embodiments, driving the pump shaft 46 at the initial pump speed 82 of approximately 3500 RPM causes the fuel pump 42 to direct the first liquid fuel 38*a* (e.g., diesel) to the fuel manifolds/nozzles 18 at approximately 600 psig. After the combustion gases drive the turbine 16 and rotate the compressor shaft 26*c* at an idle speed 84 at $T_1$, the controller 52 may control the VFD/SR 48 of the motor 44 at $T_2$ to increase the pump speed from the initial pump speed 82 to a startup fuel speed 86 at $T_3$. In certain embodiments, the idle speed 84 of the compressor shaft 26*c* of the gas turbine system 10 is between 6800 and 7000 RPM. In certain embodiments, driving the pump shaft 46 at the startup fuel speed 86 of approximately 5150 RPM causes the fuel pump 42 to direct the first liquid fuel 38*a* to the fuel manifolds/nozzles 18 at a transition pressure (e.g., approximately 1200 psig). The shaft speed may increase from the idle speed 84 at $T_1$ to a minimum load speed 88 between 7100 and 7500 RPM at $T_2$ in response to the control of the fuel from the pump to the combustor 14 at $T_2$.

The combustion gases from combustion of the first liquid fuel 38*a* in the combustor 14 may continue to increase the speed of the compressor shaft 26*c* from the minimum load speed 88 between 7100 and 7500 RPM at $T_2$ to a fuel transfer speed 90 at $T_4$. At the fuel transfer speed 90, the gas turbine system 10 may be configured stably operate and drive a fuel transfer with the first liquid fuel 38*a*, the second liquid fuel 38*b*, or any combination thereof. In certain embodiments, the fuel transfer speed 90 for stable operation of the gas turbine system 10 is between 8200 and 10000 RPM. In certain embodiments, the pressure of the first liquid fuel 38*a* provided by the variable-speed fuel pump 42 at the startup fuel speed 86 is determined based on a vapor pressure of the second liquid fuel 38*b* that is to be added with the first liquid fuel 38*a* during a first transition period 92. That is, the controller 52 may control the VFD/SR 48 linked to the fuel pump 42 at the startup fuel speed 86 with the first liquid fuel 38*a* during the startup period 78 to facilitate a transfer during the first transition period 92 from the first liquid fuel 38*a* to the second liquid fuel 38*b* without changing the phase of the first liquid fuel 38*a* or the second liquid fuel 38*b*. It may be appreciated that if the fuel pump 42 receives the first liquid fuel 38*a* at a pressure less than the vapor pressure of the second liquid fuel 38*b*, then the fuel pump 42 may receive a two-phase flow in which the first liquid fuel 38*a* is received as a liquid and the second liquid fuel 38*b* is received as a gas. The controller 52 may control the VFD/SR 48 linked to the fuel pump 42 and the startup fuel speed 86 to avoid providing a two-phase flow to the fuel pump 42 from any of the fuel sources. The controller 52 may determine the startup fuel speed 86 based at least in part on feedback from the sensors of the fuel pressure of the fuel sources, the fuel temperatures of the fuel sources, fuel properties entered by the operator, or any combination thereof.

During the transition period, the controller 52 may maintain a first flow of the first liquid fuel 38*a* to the fuel pump 42 and increase a second flow of the second liquid fuel 38*b* to the fuel pump 42. The controller 52 may control the VFD/SR 48 of the motor 44 to increase the speed of the fuel pump 42 during the transition period from the startup fuel speed 86 at $T_4$ to the primary fuel speed 94 at $T_5$ to facilitate directing the additional second liquid fuel 38*b* to the fuel pump 42 without adjusting the pressure (e.g., discharge pressure) of the fuels supplied by the fuel pump 42. That is, the controller 52 may control the VFD/SR 48 of the motor 44 to adjust the speed of the fuel pump 42 during the transition period to maintain the discharge pressure within a range of a desired pressure (e.g., transition pressure). In an embodiment in which the first liquid fuel 38*a* is a diesel liquid fuel and the second liquid fuel 38*b* is a liquid butane fuel, the primary fuel speed 94 may be approximately 6060 RPM. The controller 52 may determine the primary fuel speed 94 of the fuel pump 42 based at least in part on the fuel parameters of the one or more fuels directed to the combustor during the ramp up period 96, the steady-state period 100 and/or the ramp down period 102. In certain embodiments, the controller 52 determines the primary fuel speed 94 of the fuel pump based at least in part on the lower heating value of the second liquid fuel 38*b*, the lubricity of the second liquid fuel 38*b*, the specific gravity of the second liquid fuel 38*b*, or the vapor pressure of the second liquid fuel 38*b*, or any combination thereof. In certain embodiments, the controller 52 may determine the composition of the fuel from feedback of the sensors 74 and the pressure transmitter 54, then determine the one or more parameters of the fuel from a table that is stored in the memory 58 or is otherwise accessible by the processor 56 of the controller 52. During the first transition period 92, the controller 52 may control the fuel feeding valves 66 to increase the quantity of the second liquid fuel 38*b* provided to the fuel pump 42 and to decrease the quantity of the first liquid fuel 38*a* provided to the fuel pump 42. In certain embodiments, the first transition period 92 is between 15 to 180 seconds, 30 to 150 seconds, or 60 to 120 seconds. As discussed in detail below, the controller 52 may first increase the quantity of the second liquid fuel 38*b* provided to the fuel pump 42 from zero to a second quantity, then decrease the quantity of the first liquid fuel 38*a* provided to the fuel pump 42 from a first quantity to zero. In general, via the control described herein, the controller 52 is configured to ensure that the first liquid fuel 38*a* and the second liquid fuel 38*b* each remain in a liquid phase during the first transition period 92.

In certain embodiments, the fuel transfer process described above may occur gradually with a predetermined ramp up from gas turbine shaft speed 88 to speed 90 without having to hold the gas turbine shaft speed at 90; that is, opening the second fuel feeding valve 38*b* to the second threshold value, while closing the first fuel feeding valve 38*a* from the first threshold value to zero. In certain embodiments, this process may be done in part by adjusting the speed of the pump 42 based on the fuel properties of the first and second fuel, the ambient properties and the gas turbine shaft ramp up speed rate.

After the first transition period 92 at $T_5$, the controller 52 may control the gas turbine system 10 during a ramp up period 96 to increase the speed of the compressor shaft 26*c* from the fuel transfer speed 90 to an operating load speed 98 at $T_6$. In certain embodiments, the operating load speed 98 is between 9500 and 15000 RPM. At the operating load speed 98, the gas turbine system 10 supplied by the second liquid fuel 38*b* is configured to drive the load during a steady-state period 100. The gas turbine system 10 may be configured to operate in the steady-state period 100 for hours, days, weeks, or more. At $T_7$, the controller 52 may control the gas turbine system 10 during a ramp down period 102 to decrease the speed of the compressor shaft 26*c* from the operating load speed 98 to the fuel transfer speed 90 at $T_5$. At $T_5$, the controller 52 controls the fuel feeding valves 66 during a second transition period 104 to decrease the quantity of the second liquid fuel 38b provided to the fuel pump 42 and to increase the quantity of another liquid fuel of the fuel supply system 30 provided to the fuel pump 42. Although the charts 75, 76 of FIG. 2 illustrate an embodiment of the transition between the first liquid fuel 38a and the second liquid fuel 38b, the controller 52 may also control transitions among more than two liquid fuels. During the second transition period 104, the controller 52 may control the feeding valves 66 to increase the quantity of the first liquid fuel 38a provided to the fuel pump 42 from zero to the first quantity, then decrease the quantity of the second liquid fuel 38b provided to the fuel pump 42 from the second quantity to zero. At $T_9$, the controller 52 may control the gas turbine system 10 in a shutdown period 106 to decrease the speed of the compressor shaft 26c from the fuel transfer speed 90 to the minimum load speed 88 at $T_{10}$. The controller 52 may decrease the speed of the pump shaft 46 at $T_{10}$ from the startup fuel speed 86 to the initial pump speed 82 at $T_{11}$, thereby preparing the fuel supply system 30 for shutdown. At $T_{11}$, the controller 52 may reduce the speed of the compressor shaft 26c and the pump speed 76 so that the speeds respectively decrease to be zero RPM at $T_{12}$. Although FIG. 2 illustrates the speed of the compressor shaft 26c and the speed of the pump shaft 46 at zero RPM at $T_{12}$, it is appreciated that in certain embodiments of the gas turbine system 10, the speed of the compressor shaft 26c and the speed of the pump shaft 46 may decrease at different rates and decrease to zero RPM at different times during the shutdown period 106. In general, via the control described herein, the controller 52 is configured to ensure that the first liquid fuel 38a and the second liquid fuel 38b each remain in a liquid phase during the second transition period 104.

The availability and cost of the liquid fuel sources 38 may vary among sites for gas turbine systems 10. For example, diesel fuel, kerosene, or gasoline may be utilized for standardized startup and shutdown procedures for the gas turbine system 10. However, some liquid fuels, such as diesel, may have less availability, higher costs, or both less availability and higher costs relative to other liquid fuels, such as distillate fuels, jet fuels, naphthas, liquid butanes, liquid propanes, liquefied petroleum gas (LPG), and other hydrocarbons or hydrocarbon mixtures, or biofuels. Furthermore, the heating values of liquid fuels differ, such that a first liquid fuel with a higher heating value may be desired for operation with higher loads than a second liquid fuel with a lower heating value. Accordingly, the controller 52 may control the fuel feeding valves 66, the VFD/SR 48 and the fuel control valve 50 to transition from a first flow of one or more liquid fuels of the fuel supply system 30 to a second flow of one or more liquid fuels of the fuel supply system 30 based on the availability of the one or more liquid fuels, the cost of the one or more liquid fuels, and/or the desired load to be driven through combustion of the one or more liquid fuels. When available and convenient to operators, startup and shutdown may be performed with any gaseous fuel through the gas fuel system train.

Figure 3:
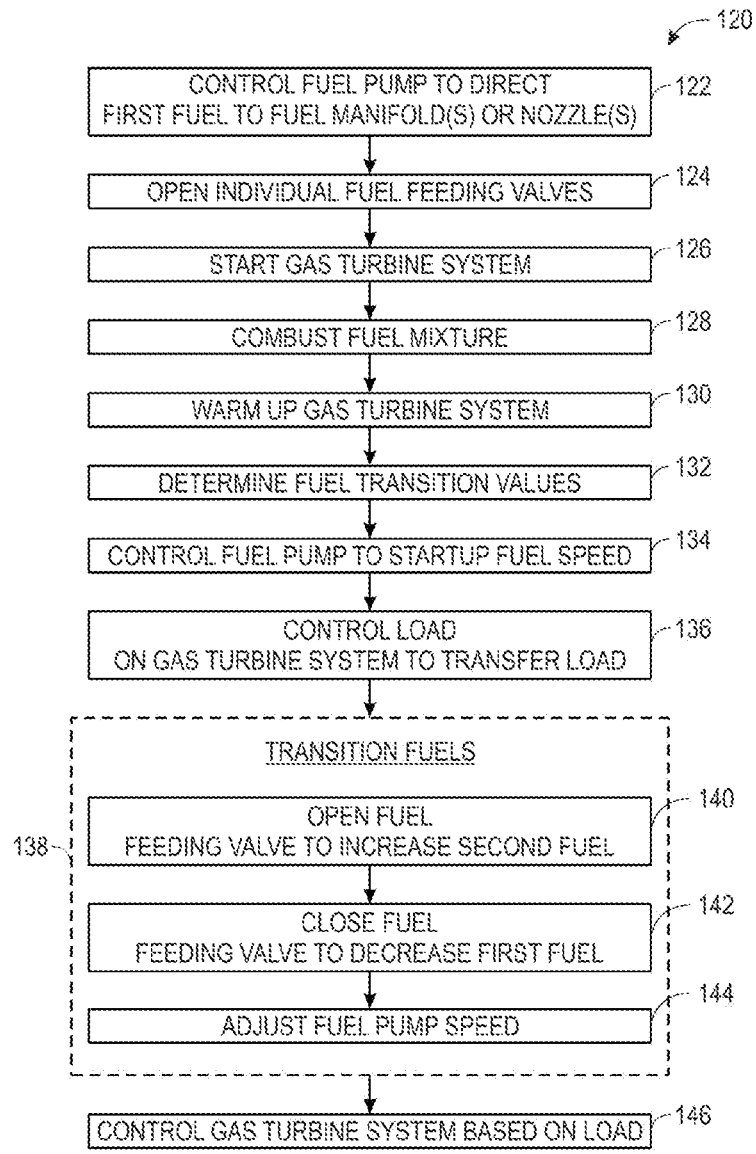
FIG. 3 is a flow chart of an embodiment to transition between fuel sources supplied from the fuel supply system to the gas turbine system.

FIG. 3 illustrates a flow chart of an embodiment of a method 120 of operating the gas turbine system from a startup with the first liquid fuel to driving a full load with the second liquid fuel or liquid fuel mixtures. The controller of the fuel supply system controls (block 122) the VFD/SR linked to the fuel pump to direct the first liquid fuel toward the one or more fuel manifolds or nozzles of the fuel supply system. The controller also opens (block 124) the fuel feeding control valve to permit flow of the first liquid fuel to the inlet of the fuel pump. The controller may execute blocks 122 and 124 at approximately the same time (e.g., within 1 to 10 seconds). The gas turbine system starts (block 126) the compressor and turbine of the gas turbine system, thereby initiating the rotation of the shaft of the gas turbine system. In certain embodiments, the controller that starts (block 126) the gas turbine system also controls the fuel supply system. When the first liquid fuel is routed to the combustor from the fuel pump by the main fuel control valve and oxidant from the compressor is routed to the combustor, the controller may control combustion (block 128) of the oxidant-fuel mixture in the combustor. As described above during the startup period 78, the controller controls the fuel and the oxidant supplied to the combustor to warm up (block 130) components of the gas turbine engine, thereby increasing the stability of the gas turbine system.

The controller determines (block 132) fuel transition values based at least in part on fuel parameters of the fuel sources of the fuel supply system. In certain embodiments, the controller determines (block 132) fuel transition values based at least in part on the fuel parameters and environmental parameters (e.g., temperature, pressure, humidity) of the ambient environment of the gas turbine system. The fuel transition values may include, but are not limited to, the startup fuel speed for the fuel pump to initiate the transition from the first liquid fuel to the second liquid fuel, the transfer load on the gas turbine system during the transition from the first liquid fuel to the second liquid fuel, a transition threshold for the one or more fuel feeding valves of the fuel supply system, a mixture of liquid fuels of the second liquid fuel provided to the combustor after the transition, or any combination thereof. The controller then controls (block 134) the VFD/SR linked to the fuel pump to the startup fuel speed based at least in part on fuel parameters of the first liquid fuel and the second liquid fuel. As discussed above, the startup fuel speed may be determined based on a vapor pressure of the second liquid fuel that is to be added with the first liquid fuel during a transition period. The controller may control (block 134) the VFD/SR linked to the fuel pump to the startup fuel speed that facilitates a transfer from the first liquid fuel to the second liquid fuel without supplying a multiphase fuel flow to the fuel pump or to the one or more fuel manifolds/nozzles. For any of these scenarios, the main fuel control valve will regulate the startup fuel flow, the liquid fuel mixture flow during the transition, and the second liquid fuel flow to the manifolds/nozzles as a supplement to the variable-speed fuel pump for liquid fuel flow control purposes.

The controller controls (block 136) the load on the gas turbine system to the transfer load at which the controller may stably transition the fuel supplied to the combustor from the first liquid fuel to the second liquid fuel by means of the main fuel control valve and the individual fuel feeding valves. The startup fuel may be diesel, kerosenes, or gasoline or a gaseous fuel, respectively. The second fuel may be a liquid fuel such as a butane, kerosene, or jet fuel, among others. As discussed above, the controller may determine (block 132) fuel transition values, like the transfer load, based at least in part on fuel parameters of the second liquid fuel. For example, if a first idle load supported by combustion of the first liquid fuel is less than a second idle load supported by combustion of the second liquid fuel, then the transfer load may be the second idle load such that the gas turbine may stably provide the transfer load during the transition from the first liquid fuel to the second liquid fuel. After the gas turbine system is supporting the transfer load, the controller transitions (block 138) from the first liquid fuel to the second liquid fuel. To transition between the fuels, the controller opens (block 140) a second fuel feeding valve for the second liquid fuel while maintaining stable operation of the gas turbine system. When the second fuel feeding valve has been opened to a second liquid fuel transition threshold, the controller closes (block 142) a first fuel feeding valve for the first liquid fuel while maintaining stable operation of the gas turbine system. To maintain stable operation of the gas turbine system, the controller may gradually open (block 140) and close (block 142) the fuel feeding valves over respective transition periods.

The transitions to open or close the fuel feeding valves may be 5, 10, 15, 20, 30, 45, or 60 seconds or more, such that the controller executes blocks 140 and 142 over a period of 10, 20, 30, 40, 60, 90, or 120 seconds or more. In certain embodiments, the controller may pause for 5, 10, 15, 30, or 60 seconds or more between opening (block 140) and closing (block 142) the fuel feeding valves during the transition (block 138). The second liquid fuel transition threshold for opening (block 140) the second fuel feeding valve may be approximately 50, 60, 70, 80, 90, or 100 percent open. During the transition (block 138) of the liquid fuels, the controller may adjust (block 144) the speed of the fuel pump by means of the VFD/SR while controlling the fuel feeding valves and the main fuel control valve over the transition periods. For example, the controller may increase the speed of the fuel pump during a transition to the second liquid fuel with a higher vapor pressure than the first liquid fuel while adjusting the position of the main fuel control valve to sustain the gas turbine load. The controller may increase the speed of the fuel pump to maintain a discharge pressure of the fuel supplied from the outlet of the pump to the combustor to be within a range (e.g., 0.5 to 10%) of a transition pressure during the transition periods, and to adjust the position of the main fuel control valve to maintain the gas turbine load. Maintaining the discharge pressure of the liquid fuel supplied to the combustor within a transition pressure range may facilitate stable combustion within the combustor during the transition period. In some instances, a gaseous fuel may be used to startup and shutdown the gas turbine system and the transition to a liquid fuel source, allowing the gas turbine system to perform transition to a second liquid fuel or mixture of other liquid fuels at steady-state or at loads higher than the transition load for startup and shutdown processes.

After the controller has closed (block 142) the first fuel feeding valve and the gas turbine system is operating fully through combustion of the second liquid fuel, the controller may control (block 146) the gas turbine system based on a desired load while operating the gas turbine system with the second liquid fuel. As may be appreciated, the controller may adjust the quantity and/or pressure of the second liquid fuel supplied to the combustor during steady-state operation of the gas turbine system in response to changes in the load on the gas turbine system by means of the main fuel control valve. The controller may repeat blocks 132-144 as described above to transition from the second liquid fuel to the first liquid fuel, to a third liquid fuel, or to a mix of one or more liquid fuels of the fuel supply system.

Figure 4:
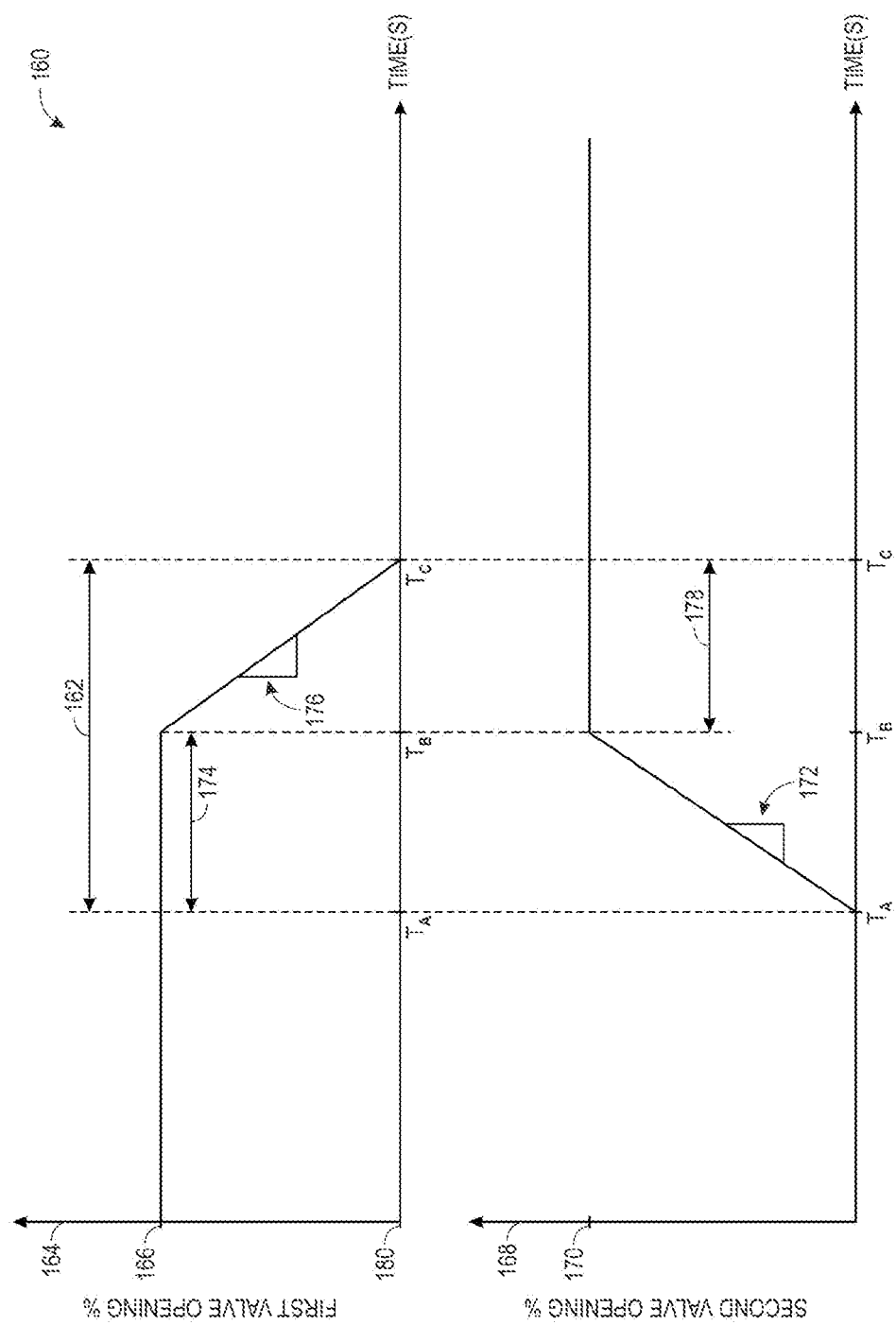
FIG. 4 is a chart illustrating the control of fuel valves during the transition of fuel sources of the fuel supply system.

FIG. 4 illustrates a chart 160 of an embodiment of the control of the fuel feeding valves for the transition between liquid fuels described above. Prior to a fuel transition 162, a first position 164 of a first fuel feeding valve configured to supply a first liquid fuel to the fuel pump is opened to a first liquid fuel threshold 166. The first liquid fuel threshold 166 may be determined by the controller of the fuel supply system based on a determined transfer load for the gas turbine system. As discussed above, the transfer load may be determined based on the fuel parameters of the first liquid fuel and the second liquid fuel and ambient conditions for the gas turbine system. For example, the controller of the fuel supply system may determine from an analysis of the fuel parameters of the first liquid fuel and the second liquid fuel that a stable transition from the first liquid fuel to the second liquid fuel may occur at a transfer load that is supported by combustion of a first quantity of the first liquid fuel supplied when the first fuel feeding valve is opened to the first liquid fuel threshold. The controller may also determine from the analysis of the fuel parameters of the first liquid fuel and the second liquid fuel that the transfer load may be supported by combustion of a second quantity of the second liquid fuel when a second position 168 of the second fuel feeding valve is opened to a second liquid fuel threshold 170. The controller may analyze the fuel parameters of the first liquid fuel and the second liquid fuel based on feedback from the sensors monitoring the respective liquid fuels, from inputs to the controller associated with the fuel parameters of the respective liquid fuels, or any combination thereof. In certain embodiments, the first liquid fuel threshold 166 is between approximately 25, 30, 40, 50, 60, 70, 75, 80, 90, or 100% open. In certain embodiments, the second liquid fuel threshold 170 is between approximately 25, 30, 40, 50, 60, 70, 75, 80, 90, or 100% open. For example, the first liquid fuel threshold 166 may be approximately 40% open, and the second liquid fuel threshold may be approximately 75% open.

To begin the fuel transition 162, the controller adjusts the second position 168 of the second fuel feeding valve at TA to open the second fuel feeding valve. A second rate 172 of opening the second fuel feeding valve may be controlled based at least in part on the valve-type (e.g., butterfly, ball, gate, globe) of the second fuel feeding valve, the stability of the gas turbine system, and parameters (e.g., viscosity, vapor pressure, specific gravity, lubricity) of the second liquid fuel, or any combination thereof. A second transition period 174 for opening the second position 168 of the second fuel feeding valve to the second liquid fuel threshold 170 may be between approximately 5, 10, 15, 20, 30, 45, or 60 seconds. The controller opens the second fuel feeding valve to the second liquid fuel threshold 170 while the first fuel feeding valve remains open to the first liquid fuel threshold 166. At TB, the second fuel feeding valve is opened to the second liquid fuel threshold 170 and the first fuel feeding valve remains opened to the first liquid fuel threshold 166. Accordingly, the first liquid fuel and the second liquid fuel are supplied to the fuel pump during the fuel transition 162. As discussed above, the speed of the fuel pump may be controlled by the VFD/SR during the fuel transition 162 based on fuel parameters of the first liquid fuel and the second liquid fuel, and based on the discharge pressure from the pressure transmitter, to avoid a two-phase flow within the fuel pump and/or downstream of the fuel pump. The gas turbine system combusts a mixture of the first liquid fuel and the second liquid fuel during the fuel transition 162.

In certain embodiments, the controller adjusts the first position 164 of the first fuel feeding valve at TB to close the first fuel feeding valve as soon as the second fuel feeding valve is opened to the second liquid fuel threshold 170. In certain embodiments, the controller may pause at TB for a stability interval (e.g., between 1 and 60 seconds) to ensure combustion stability of the gas turbine system prior to adjusting the first position 164 of the first fuel feeding valve. A first rate 176 of closing the first fuel feeding valve may be controlled based at least in part on the valve-type (e.g., butterfly, ball, gate, globe) of the first fuel feeding valve, the stability of the gas turbine system, and parameters (e.g., viscosity, vapor pressure, specific gravity, lubricity) of the first liquid fuel, or any combination thereof. A first transition period 178 for closing the first position 164 of the first fuel feeding valve from the first liquid fuel threshold 166 to a fully closed position 180 may be between approximately 5, 10, 15, 20, 30, 45, or 60 seconds. The controller closes the first fuel feeding valve while the second feeding valve remains open to the second liquid fuel threshold 170. At $T_C$, the second fuel feeding valve remains opened to the second liquid fuel threshold 170, and the first fuel feeding valve is commanded to the fully closed position 180. Accordingly, only the second liquid fuel is supplied to the fuel pump after the fuel transition 162. After $T_C$, the controller may adjust the position of the main fuel control valve and the speed of the fuel pump by means of the VFD/SR to supply desired a quantity and pressure of the second liquid fuel to the combustor of the gas turbine system to drive a desired load.

Technical effects of the present disclosure include transitioning from a first liquid fuel supplied to a combustor of a gas turbine system to a second liquid fuel supplied to the combustor utilizing one fuel pump configured to supply both fuels from one fuel pump during the transition without shutting down the gas turbine system. Through utilizing one fuel pump and adjusting the operation of the pump during the transition, the additional costs, size, and operational complexity associated with multiple liquid fuel trains to facilitate operation of the gas turbine system with multiple liquid fuels may be avoided. The utilization of multiple liquid fuels during operation of a gas turbine system increase the operational flexibility of the gas turbine system by enabling the utilization of varied liquid fuel sources and/or local liquid fuel sources during a steady-state operation, yet utilizing standardized fuel sources (e.g., diesel, kerosene, gasoline and in some cases, gaseous fuels) for startup or shutdown procedures.

This written description uses examples to disclose the embodiments of the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

ELEMENT LIST

10—gas turbine system
12—compressor
14—combustor(s)
16—turbine
18—fuel manifolds/nozzles
20—air
24—combustion gases
26c—compressor shaft
26t—gas turbine shaft
28—exhaust gas
30—fuel supply system
32—load
34—air intake
36—pressurized airflow
38—liquid fuel sources
40—fuel or air-fuel mixture
42—fuel pump
44—motor
46—pump shaft
48—variable frequency driver (VFD) or switch reluctance (SR) motor speed variation device
50—main fuel control valve
52—controller
54—pressure transmitter
56—processor
58—memory
60—motor control line
62—pump inlet
64—pump outlet
66—fuel feeding valve
68—feeding valve control line
70—forwarding pump
72—gas fuel sources
74—sensors
75—gas turbine compressor shaft speed
76—fuel pump shaft speed
78—startup period
80—starter speed
82—initial pump speed
84—idle speed (gas turbine shaft)
86—startup fuel speed (pump)
88—minimum load speed (gas turbine shaft)
90—transfer load speed (gas turbine shaft)
92—first transition period
94—primary fuel speed (pump)
96—ramp up period
98—operating load speed (gas turbine shaft)
steady state period
102—ramp down period
104—second transition period
106—shut down period
120—method
122—control fuel pump to direct first fuel to fuel manifolds/nozzles
124—open fuel feeding control valves
126—start gas turbine system
128—combust liquid fuel mixture
130—warm up gas turbine system
132—determine fuel transition values
134—control fuel pump to startup fuel speed
136—control load on gas turbine system to transfer load
138—transition fuels during transition period
140—open fuel feeding valve to increase second liquid fuel
142—close fuel feeding valve to decrease first liquid fuel
144—adjust fuel pump speed
146—control gas turbine system based on load
160—chart
162—fuel transition period
164—first fuel feeding valve position
166—first liquid fuel threshold
168—second fuel feeding valve position
170—second liquid fuel threshold
172—second rate (second liquid fuel)
174—second transition period (second fuel feeding valve open)
176—first rate (first liquid fuel)
178—first transition period (first fuel feeding valve close)
180—fully closed position (first fuel feeding valve)

The invention claimed is:

1. A system comprising:
a fuel supply system comprising:
   a fuel pump comprising an inlet and an outlet;
   a pump discharge pressure sensor configured to monitor a discharge pressure from the fuel pump;
   a first fuel feeding valve configured to control a first flow of a first liquid fuel to the inlet based at least in part on first feeding valve control signals;
   a second fuel feeding valve configured to control a second flow of a second liquid fuel to the inlet based at least in part on second feeding valve control signals;
   a motor coupled to the fuel pump, wherein the motor comprises a variable frequency drive device configured to drive the motor, wherein the motor is configured to drive the fuel pump based at least in part on pump speed control signals;
   a main fuel control valve configured to regulate fuel flow to fuel manifolds/nozzles of a gas turbine system based at least in part on main fuel valve control signals, wherein the main fuel valve control signals are based at least in part on load demands of the gas turbine system and based at least in part on costs and availabilities of the first and second liquid fuels; and
   a controller coupled to the motor, the first fuel feeding valve, the second fuel feeding valve and the main fuel control valve, wherein the controller is configured to generate the first feeding valve control signals, the second feeding valve control signals, the pump speed control signals, and the main fuel control valve signals based at least in part on one or more first fuel parameters of the first liquid fuel and one or more second fuel parameters of the second liquid fuel, wherein the controller is configured to control a full transition from the first flow to the inlet at a first time to the second flow to the inlet at a second time while maintaining the load demands of the gas turbine system during operation of the gas turbine system, wherein the controller is configured to ensure that the first and second liquid fuels each remain in a liquid phase and the discharge pressure remains within a transition pressure range during the full transition, and wherein the controller is configured to control a speed of the motor by:
      determining a first speed of the motor based at least in part on the one or more first fuel parameters of the first liquid fuel, wherein the one or more first fuel parameters comprise a first vapor pressure of the first liquid fuel;
      determining a second speed of the motor based at least in part on the one or more second fuel parameters of the second liquid fuel, wherein the one or more second fuel parameters comprise a second vapor pressure of the second liquid fuel; and
      controlling the speed of the motor from the first speed to the second speed during the full transition from the first flow to the second flow, wherein controlling the speed comprises increasing the speed of the motor from the first speed to the second speed in response to the second vapor pressure being greater than the first vapor pressure.

2. The system of claim 1, wherein the controller is configured to control the full transition during a startup operation or a shutdown operation of the gas turbine system.

3. The system of claim 1, wherein the pump speed control signals are configured to control the speed of the motor, and wherein the fuel pump comprises a centrifugal pump.

4. The system of claim 1, wherein the pump discharge pressure sensor is coupled to the outlet of the fuel pump, the pump discharge pressure sensor is configured to provide feedback of the discharge pressure to the controller, and the controller is configured to generate the first feeding valve control signals, the second feeding valve control signals, and the pump speed control signals during the full transition based at least in part on the feedback of the discharge pressure from the pump discharge pressure sensor.

5. The system of claim 4, wherein the controller is configured to generate the pump speed control signals during the full transition to control the discharge pressure at the outlet to be within the transition pressure range.

6. The system of claim 1, comprising one or more fuel sensors configured to provide feedback to the controller of the one or more first fuel parameters, the one or more second fuel parameters, or any combination thereof, wherein the controller is configured to generate the first feeding valve control signals, the second feeding valve control signals, and the pump speed control signals during the full transition based at least in part on the feedback from the one or more fuel sensors.

7. The system of claim 1, comprising the gas turbine system, wherein the gas turbine system comprises:
   a combustor configured to receive a flow from the outlet of the fuel pump, to combust a mixture of the flow and an oxidant to generate exhaust gas, and to expand the exhaust gas through a turbine;
   the turbine configured to expand the exhaust gas to drive a shaft; and
   the shaft coupled to the turbine and to a load, wherein the controller is configured to generate the first feeding valve control signals, the second feeding valve control signals, the pump speed control signals, and the main fuel valve control signals during the full transition based at least in part on a speed of the shaft, the load on the shaft, or any combination thereof.

8. The system of claim 1, wherein a transition period is equal to or less than 120 seconds.

9. The system of claim 1, wherein the controller is configured to:
   determine a transition load based at least in part on the one or more first fuel parameters of the first liquid fuel and the one or more second fuel parameter of the second liquid fuel; and
   control the load during a transition period based at least in part on the transition load.

10. The system of claim 9, wherein the transition load ensures that the first liquid fuel and the second liquid fuel each remain in the liquid phase during the transition period.

11. The system of claim 1, wherein the one or more first fuel parameters comprise a first specific gravity of the first liquid fuel, and the one or more second fuel parameters comprise a second specific gravity of the second liquid fuel.

12. The system of claim 1, wherein the transition pressure range is 0.5 to 10% of a transition pressure during the full transition.

13. A method for fully transitioning between liquid fuel flows supplied to a gas turbine system during operation of the gas turbine system, comprising:

supplying a first liquid fuel to an inlet of a fuel pump through a first fuel feeding valve opened to a first liquid fuel threshold, wherein the first liquid fuel threshold is based at least in part on a first fuel parameter of the first liquid fuel;

directing the first liquid fuel from an outlet of the fuel pump to a combustor of the gas turbine system;

combusting the first liquid fuel with an oxidant in the combustor to generate exhaust gas;

expanding the exhaust gas through a turbine of the gas turbine system to drive a shaft coupled to the turbine and to a load;

determining a transition load based at least in part on the first fuel parameter of the first liquid fuel and a second fuel parameter of a second liquid fuel; and fully transitioning over a transition period from combustion of the first liquid fuel in the combustor to combustion of the second liquid fuel in the combustor, wherein the transition period is equal to or less than 120 seconds, wherein fully transitioning comprises:

controlling the load during the transition period based at least in part on the transition load;

opening a second fuel feeding valve to a second liquid fuel threshold to supply the second liquid fuel to the inlet of the fuel pump while supplying the first liquid fuel to the inlet, wherein the second liquid fuel threshold is based at least in part on the second fuel parameter of the second liquid fuel;

closing the first fuel feeding valve from the first liquid fuel threshold to stop supplying the first liquid fuel to the inlet in response to opening the second fuel feeding valve to the second liquid fuel threshold;

controlling a main fuel control valve configured to regulate fuel flow of the gas turbine system based at least in part on load demands of the gas turbine system and based at least in part on costs and availabilities of the first and second liquid fuels and to ensure that the first liquid fuel and the second liquid fuel each remain in a liquid phase during the transition period; and controlling a speed of a motor configured to drive the fuel pump to maintain a discharge pressure of a liquid fuel flow at the outlet to be within a range of a transition pressure and to ensure that the first liquid fuel and the second liquid fuel each remain in a liquid phase during the transition period, wherein the liquid fuel flow comprises the first liquid fuel, the second liquid fuel, or any combination thereof, wherein controlling the speed of the motor comprises:

determining a first speed of the motor based at least in part on the first fuel parameter of the first liquid fuel;

determining a second speed of the motor based at least in part on the second fuel parameter of the second liquid fuel; and controlling the speed of the motor from the first speed to the second speed during the full transition from combustion of the first liquid fuel in the combustor to combustion of the second liquid fuel in the combustor.

14. The method of claim 13, comprising:
monitoring the second liquid fuel with a sensor to determine the second fuel parameter of the second liquid fuel; and
determining the second liquid fuel threshold.

15. The method of claim 13, wherein the transition load ensures that the first liquid fuel and the second liquid fuel each remain in the liquid phase during the transition period.

16. The method of claim 13, wherein the first fuel parameter comprises a first vapor pressure of the first liquid fuel, the second fuel parameter comprises a second vapor pressure of the second liquid fuel, and controlling the speed comprises increasing the speed of the motor from the first speed to the second speed in response to the second vapor pressure being greater than the first vapor pressure.

17. The method of claim 13, wherein the transition period occurs during a startup operation or a shutdown operation of the gas turbine system.

* * * * *